(12) United States Patent
Koski

(10) Patent No.: US 7,826,474 B2
(45) Date of Patent: **\*Nov. 2, 2010**

(54) P-PERSISTENT CARRIER SENSE MULTIPLE ACCESS (CSMA) FOR NON-PACKETIZED WIRELESS DIGITAL VOICE NETWORKS

(75) Inventor: Eric Koski, Fairport, NY (US)

(73) Assignee: Harris Corporation, Melbourne, FL (US)

( * ) Notice: Subject to any disclaimer, the term of this patent is extended or adjusted under 35 U.S.C. 154(b) by 844 days.

This patent is subject to a terminal disclaimer.

(21) Appl. No.: 11/457,191

(22) Filed: Jul. 13, 2006

(65) Prior Publication Data

US 2008/0013564 A1   Jan. 17, 2008

(51) Int. Cl.
H04L 12/413 (2006.01)

(52) U.S. Cl. .................. 370/445; 370/431; 455/517; 455/518; 455/519; 455/520

(58) Field of Classification Search ............. 370/431, 370/445; 455/518, 519, 520
See application file for complete search history.

(56) References Cited

U.S. PATENT DOCUMENTS

| | | | | |
|---|---|---|---|---|
| 4,719,617 A * | 1/1988 | Yanosy et al. | | 370/438 |
| 5,706,274 A * | 1/1998 | Angelico et al. | | 370/445 |
| 5,726,984 A * | 3/1998 | Kubler et al. | | 370/349 |
| 5,729,542 A | 3/1998 | Dupont | | 370/346 |
| 5,752,193 A | 5/1998 | Scholefield et al. | | 455/452 |
| 5,862,452 A | 1/1999 | Cudak et al. | | 455/6.3 |
| 6,236,662 B1 | 5/2001 | Reilly | | 370/462 |
| 6,339,584 B1 * | 1/2002 | Gross et al. | | 370/225 |
| 7,027,462 B2 | 4/2006 | Benveniste | | 370/447 |
| 7,292,564 B2 * | 11/2007 | Ekstrom et al. | | 370/350 |
| 7,313,103 B2 * | 12/2007 | Cox et al. | | 370/285 |
| 2007/0281617 A1 * | 12/2007 | Meylan et al. | | 455/41.2 |

FOREIGN PATENT DOCUMENTS

EP    1022880    7/2000

OTHER PUBLICATIONS

Fouad A. Tobagi, "Multiaccess Protocols in Packet Communication Systems" IEEE Transactions on Communications, Vol.com-28, No. 4, Apr. 1980.*
R. Bruno et al., "Optimization of Efficiency and Energy Consumption in p-Persistent CSMA-Based Wireless LANs," IEEE Transactions on Mobile Computing, vol. 1, No. 1, Jan.-Mar. 2002, pp. 10-31.
Chan-Soo Hwang et al., "Opportunistic p-persistent CSMA in Wireless Networks," Communications, 2006, ICC, IEEE International Conference on IEE, PI, Jun. 2006, pp. 183-188.
Takagi et al., *"Throughput Analysis for Persistent CSMA Systems,"* IEEE Transactions on Communications, vol. COM-33, No. 7, Jul. 1985, pp. 627-638.
Kleinrock et al., *"Packet Switching in Radio Channels: Part I—Carrier Sense Multiple-Access Modes and Their Throughput-Delay Characteristics,"* IEEE Transactions on Communications, vol. COM-23, No. 12, Dec. 1975, pp. 1400-1416.

* cited by examiner

Primary Examiner—William Trost, IV
Assistant Examiner—Siming Liu
(74) Attorney, Agent, or Firm—Allen, Dyer, Doppelt, Milbrath & Gilchrist, P.A.

(57) ABSTRACT

A communications system includes a plurality of radios that form a CSMA wireless communications network to communicate none-packetized digital voice with each other. Each radio is operative for dividing the period following the end of a received transmission into a sequence of time slots, each having a duration at least equal to an effective end-to-end traffic latency. In each time slot, the radio decides randomly with probability p whether to start transmitting on the channel in that slot, provided that a new transmission has not been detected on the channel prior to the start of the slot.

32 Claims, 10 Drawing Sheets

P-PERSISTENT CARRIER SENSE MULTIPLE ACCESS (CSMA) FOR NON-PACKETIZED WIRELESS DIGITAL VOICE NETWORKS

FIELD OF THE INVENTION

The present invention relates to communications systems, and more particularly, this invention relates to CSMA communications systems.

BACKGROUND OF THE INVENTION

Carrier Sense Multiple Access (CSMA) is often used in communications and is a typical probabilistic Media Access Control (MAC) protocol where nodes verify the absence of other traffic before transmitting on a shared physical medium, for example, a wired network or a radio frequency (RF) spectrum. The term "carrier sense" refers to a node's listening on a communications medium for a carrier wave or other distinctive feature of a transmitted signal in order to detect the presence of a prior transmission from another node on the shared medium, before attempting to transmit a signal on the same shared medium. If a prior transmission is detected, the node waits for the prior transmission to finish before initiating its own transmission. The term "multiple access" refers to the multiple nodes that send and receive on the transmission medium. Transmissions by one node can generally be received by other nodes using the medium.

In p-persistent CSMA, the letter "p" refers to the probability that a node having communications traffic to send will start transmitting in a specific period of time following the end of a received prior transmission. This is also referred to as the transmission probability, with values ranging from 0 to 1. A system in which a node having traffic to send always starts transmitting immediately once the prior transmission ends is an instance of 1-persistent CSMA, indicating there is a 100% chance that an immediate transmission will take place when a channel becomes idle. Waiting a random time before transmitting represents p-persistent CSMA, which is intended to reduce the probability of transmission collisions by giving different nodes different times at which they are permitted to start transmitting based on the transmission probability "p". Each node with traffic to send waits a random or pseudo-random time before starting to transmit. The statistical distribution of the wait times is determined by the value of the transmission probability. As each node waits, it monitors the channel. If it detects the start of another node's transmission before its own transmission time arrives, it cancels or reschedules its own transmission so as to prevent the collision of multiple transmissions on the shared medium that would otherwise occur.

Some wireless digital communications media, for example high frequency (HF) communications systems require substantial Forward Error Correction (FEC) coding and interleaving to provide adequate digital voice communications reliability. Use of these encoding and interleaving techniques results in significant end-to-end delivery latency, which creates a severe vulnerability to transmission collisions, greatly reducing network traffic capacity in single-frequency networks. Many users rely on single-frequency communications because of their all-informed character, which means that any network member can hear any other network member's transmissions. However, single-frequency communications networks have been found to suffer from severely limited capacity due to frequent traffic collisions when their delivery latencies are relatively large.

In packetized digital voice communications, a voice signal to be communicated to one or more recipients is first converted into a sequence of digital data whose length is determined by the time duration of the signal. The digital data sequence is then divided into data packets of up to a fixed maximum length determined by the digital data network by which the data packets are to be delivered. For instance, in Voice Over IP (VoIP), the maximum sizes of the IP packets in which the digital voice data are contained is determined by the Maximum Transmission Unit (MTU) sizes of the data network and its component subnetworks. The division of the digital data sequence into packets adds significant overhead, but this overhead can be tolerated in these systems because the communications bandwidth (channel capacity) of the digital data network is much larger than the data rate of the digital voice data. The underlying digital data networks used to deliver the digital voice data in packetized digital voice communications use a wide variety of communications techniques, including some forms of p-persistent CSMA.

In non-packetized digital voice communications, the digital data sequence representing the voice signal is transmitted over the physical communications medium as a single unbroken sequence of modulated digital data instead of being broken into multiple packets. This is typically necessary because the communications channel capacity is not significantly greater than the digital voice data rate, so that the additional overhead that would result from dividing the digital voice data into multiple packets cannot be tolerated. Military and public safety radio systems frequently employ non-packetized digital voice communications because of the limited communications bandwidths available to these systems.

Designers of non-packetized digital voice communications systems are aware of the desirability of limiting end-to-end latency. In doing so, however, many system designers are motivated by a concern about system responsiveness and user acceptance, and not about network capacity. Some systems, such as the APCO Project 25 Land Mobile Radio system, attempt to detect incoming voice signaling as early as possible, to avoid potential collisions. It has been found, however, that network capacity achievable in this way is limited to approximately 54%, as in 1-persistent CSMA. Any transmission overhead reduces the effective network capacity to below 54%.

SUMMARY OF THE INVENTION

The communications system includes a plurality of radios that form a CSMA wireless communications network to communicate non-packetized digital voice with each other. Each radio is operative for dividing the period following the end of a received transmission into a sequence of time slots, each of which has a duration at least equal to an effective traffic detection latency. In each time slot, the radio decides randomly with probability p whether to start transmitting on the channel in that slot, provided that a new transmission has not been detected on the channel prior to the start of the slot.

Each radio can include a transmit key switch, wherein each radio is operative for either commencing transmission once a chosen time slot is reached, or aborting transmission and processing an incoming new transmission if the transmission arrives earlier than the chosen time slot. Each radio can be operative for choosing a slot duration in the sequence of the slots at least equal to an effective latency plus a maximum propagation time to permit a transmission commenced in slot "n" to be detected prior to a start of slot "n+1". At least one of the radios can also adapt a probability (p) based on one of at least traffic loading, number of stations, priority of traffic and durations of past transmissions. The effective traffic detection latency is substantially equal to an end-to-end latency. At least one of the radios is also operative for determining a first transmission time slot in which a transmission can be commenced.

Slot transmission probabilities (p) for successive transmission time slots are adjusted to compensate for a probability distribution of key switch actuation over time. At least one of the radios can be operative for inferring whether collisions are likely from patterns in a temporal sequence of past transmissions on a communications channel. At least one of the radios can also be operative for determining whether to apply p-persistence on each occasion on which a voice transmission ends and a communications channel becomes free.

A method aspect is also set forth. In one method aspect, it can include steps of receiving within a radio a non-packetized digital voice communications over a CSMA wireless communications channel and determining at the radio the start time of a sequence of transmit time slots. The method further includes determining which of the transmit time slots in the sequence is the first slot in which a radio can transmit. If a key switch at the radio is depressed before a start of a time slot in which the radio can transmit, the method further includes playing an audible signal as a hold-off tone at the radio and informing an operator that the radio must wait before transmitting. When a next time slot arrives in which the radio can transmit, the audible signal is removed and the radio proceeds to transmit. If a key switch is depressed after a start of the time slot, the radio waits for a start of a next time slot to transmit.

In yet another aspect, the method includes a step of playing a received voice signal to prevent a collision that would have occurred between incoming and outgoing transmissions. The method further includes determining approximately the same persistence interval start time at different radios, with small residual time differences resulting only from different propagation delays within the network. The method further includes playing a received voice signal if the radio receives an incoming voice signal before it starts to transmit in response to actuation of a key switch. The method can further include the operator's pressing and holding a transmit key switch at a radio to transmit, and the radio's either commencing transmission once a chosen time slot is reached, or aborting transmission and processing an incoming transmission if one arrives earlier than the chosen time slot.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

Different embodiments will now be described more fully hereinafter with reference to the accompanying drawings, in which preferred embodiments are shown. Many different forms can be set forth and described embodiments should not be construed as limited to the embodiments set forth herein. Rather, these embodiments are provided so that this disclosure will be thorough and complete, and will fully convey the scope to those skilled in the art. Like numbers refer to like elements throughout.

In accordance with a non-limiting example of the present invention, a p-persistent CSMA protocol is applied to voice communications networks. An explicit random "dead time" can be added following each received transmission. A receiving radio can implement a precise time-slotted "persistence delay" scheme. For example, a user wishing to transmit immediately following a channel-busy period is allowed to transmit only starting in a randomly-chosen time slot. The operator would press and hold the key switch to transmit. The radio either commences transmission once the chosen time slot is reached, or aborts the transmission and processes an incoming transmission if a transmission arrives earlier than the chosen time slot.

Figure 1:
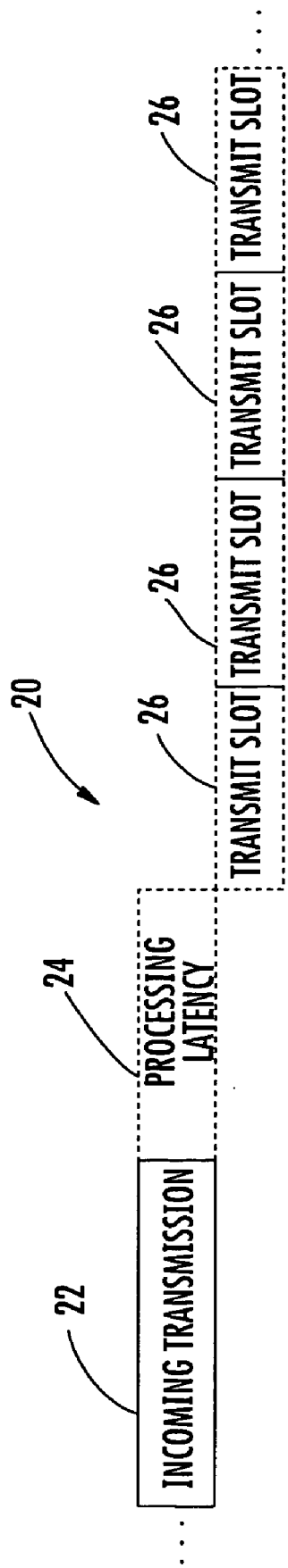
FIG. 1 is a fragmentary block diagram of a block transmitted frame showing an incoming transmission, processing latency, and transmission slots.

The slot duration should be at least equal to the effective latency, plus a maximum propagation time, to permit a transmission commenced in slot "n" to be detected prior to the start of slot "n+1." Such a communications scheme is operative using an application of a slotted p-persistent CSMA protocol. In accordance with non-limiting examples of the present invention, a slotted p-persistent CSMA protocol has the time following the end of a received transmission divided into a sequence of time slots of a duration at least equal to the effective traffic detection latency "a." In each slot, if the system has not detected a new transmission on the channel, each station with new traffic begins to transmit with probability "p." FIG. 1 is a high-level diagram of a communications transmission shown at 20, which includes an incoming transmission 22 and showing processing latency 24 and transmit slots 26.

In the system, there could be an increased overhead due to channel idle time, which is not required if the offered load is low or collision probability is low for some other reason. The system as described can exploit regularities in military voice communications operating procedures, for example, to apply p-persistence selectively to events constituting collision opportunities. For example, in military voice procedures, each voice message transmission is typically acknowledged. All operators can know that an acknowledgement is expected, and will wait to avoid colliding with it. Since this behavior of the operators will usually suffice to prevent collisions, it is possible in these situations to eliminate or reduce the "persistence wait" and avoid incurring overhead. After the acknowledgement is transmitted, a channel is "free to all corners," and a "persistence wait" can be used to prevent collisions. Adaptation of the transmission probability "p" can be based on traffic loading, the number of stations, the priority of traffic, or durations of past transmissions.

As is known to those skilled in the art, p-persistent CSMA is a common element of many packet data networks, which are often used for digital voice traffic. Time Division Multiple Access (TDMA) has also been a technique of choice to many skilled in the art for sharing a channel among multiple voice users.

The system, apparatus and method of the present invention, in non-limiting examples, allows the application of p-persistent CSMA to non-packetized digital voice traffic and exploits voice communication patterns to reduce p-persistent CSMA overhead.

It should be understood that secure non-packetized digital voice communication is and remains a dominant mode of use in many radio products, including military HF, VHF, UHF, and Tactical Satellite Communications (TACSATCOM) radio systems as well as public safety Land Mobile Radio (LMR) systems such as APCO Project 25.

An HF radio can be a replacement for VHF Combat Net Radios (CNR's) in some applications. It can exploit increased range made possible by HF propagation characteristics, for example, ground wave and Near Vertical Incidence Skywave (NVIS). The system could be applicable to wireless single-channel media other than HF, wherever high-latency digital voice bearers are typically used.

It should be understood that HF systems have small bandwidth and unavoidable large latencies. This can also be true of other radio systems such as Project 25 (P25) and other Land Mobile Radio (LMR) systems.

Figure 2:
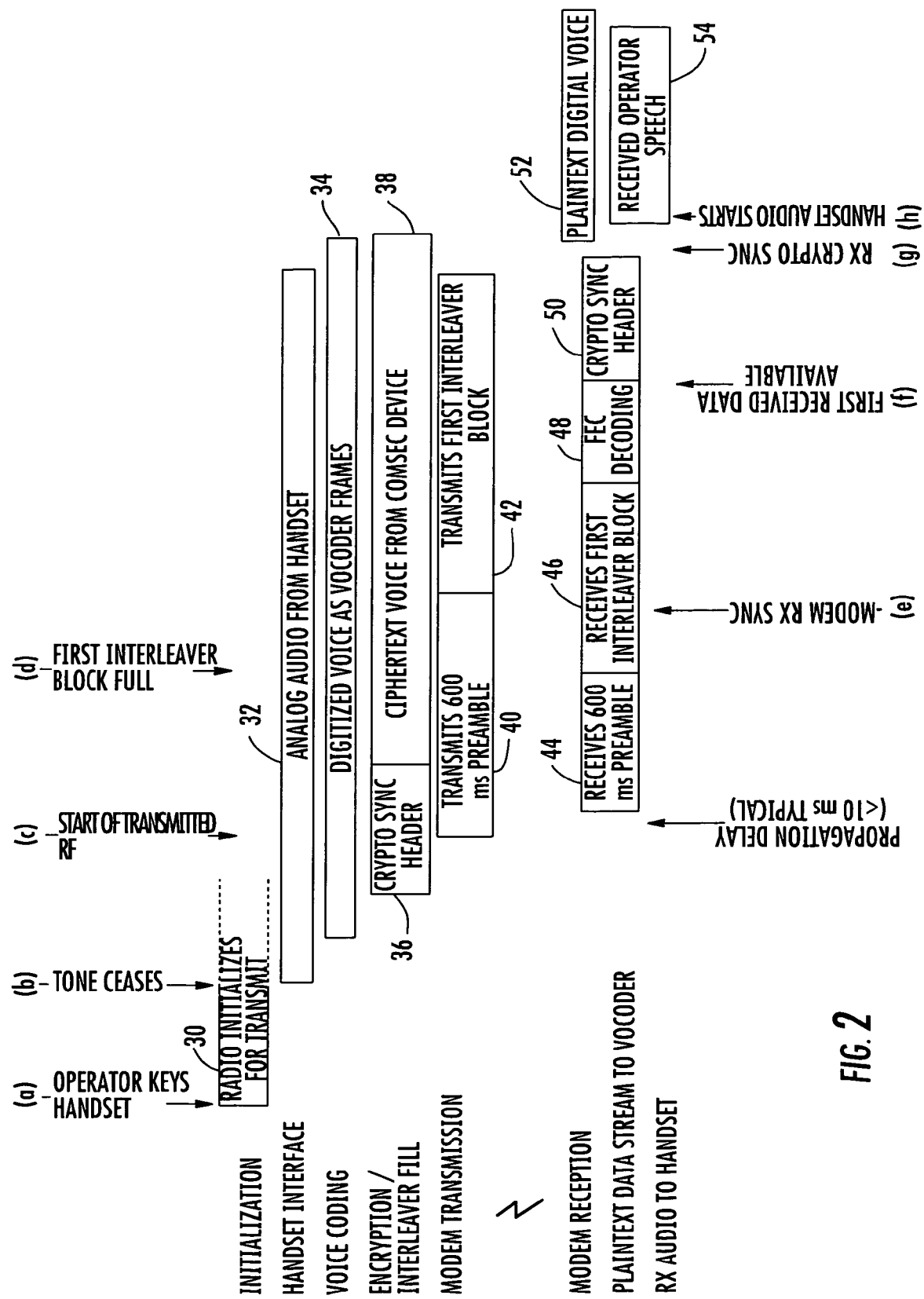
FIG. 2 is a block diagram showing an example of various elements that contribute to voice latency in communications systems.

FIG. 2 is a block diagram showing an example of elements of voice latency and the factors affecting it. Propagation delay could be less than 10 milliseconds for most "extended-range CNR" systems, but could be 80 milliseconds for long-haul skywave systems in which HF radios are commonly used. FIG. 2 shows basic initialization where the radio initializes for transmit (block 30). The handset interface is used to play a hold-off tone to the operator, and then is used to receive the analog audio signal to be transmitted. (block 32). Voice coding occurs, producing digitized voice in the form of vocoder frames (block 34). Encryption and interleaver fill occurs with a crypto sync header (block 36) and ciphertext voice data (block 38). A modem transmission occurs, for example, with transmission of a 600 millisecond preamble (block 40) followed by transmission of a first interleaver block (block 42). Modem reception occurs with a 600 millisecond preamble (block 44), receipt of a first interleaver block (block 46), a delay due to decoding of a Forward Error Correction (FEC) code (block 48) and receipt of a crypto sync header (block 50). The data stream to the vocoder contains plain text digital voice (block 52) and is provided to the receiver's handset audio interface as received operator speech (block 54). The different sequences at the top show an (a) operator keys handset, (b) hold-off tone ceases, (c) start of transmitted radio frequency (RF), and (d) first interleaver block full.

A receiver sequence at the bottom shows (e) modem receive sync, (f) first received data available, (g) received crypto sync, and (h) handset audio starts.

Figure 3:
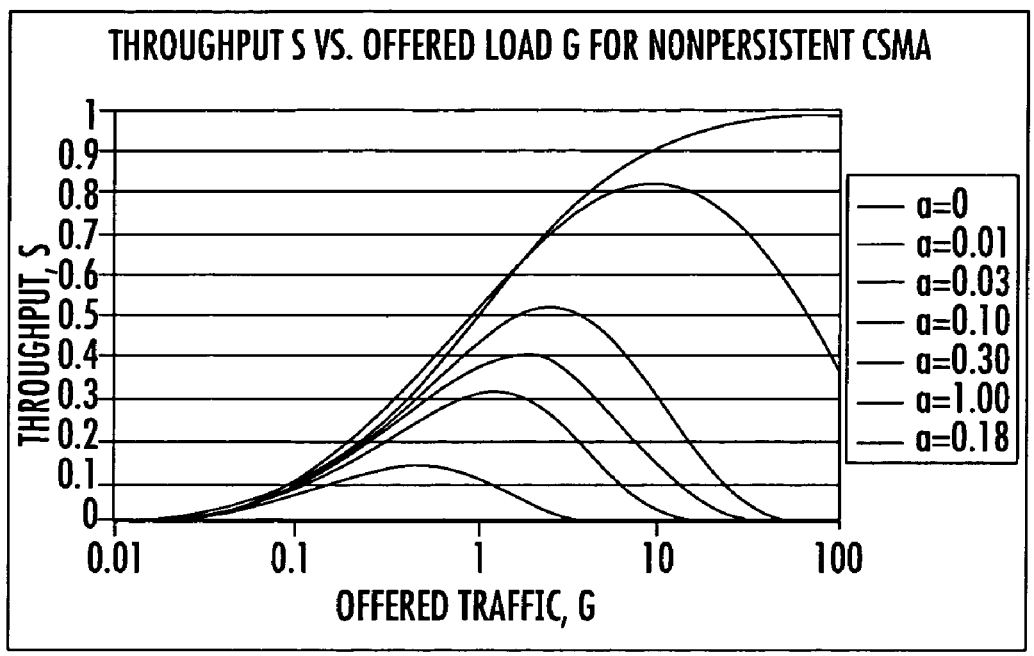
FIG. 3 is a graph showing an example of throughput for non-persistent CSMA.
Figure 4:
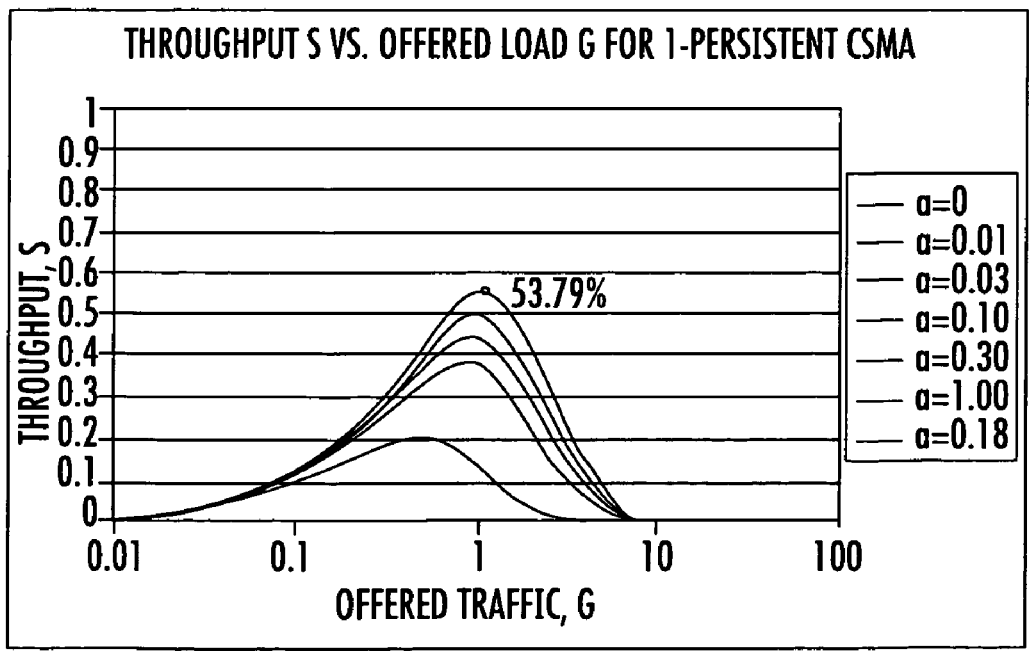
FIG. 4 is a graph showing an example of throughput for 1-persistent CSMA.

FIGS. 3 and 4 are graphs showing an analysis of a non-persistent (FIG. 3) versus a 1-persistent CSMA (FIG. 4). FIG. 3 shows the throughput "S" versus offered load "G" for non-persistent CSMA. The non-persistent CSMA achieves a high maximum throughput, but the "S" is low for realistic offered loads. FIG. 4 shows the 1-persistent CSMA that is more efficient up to G=1, but the throughput falls off rapidly thereafter. As shown in FIG. 4, the system suffers from frequent collisions once a channel becomes free following a transmission.

Figure 5:
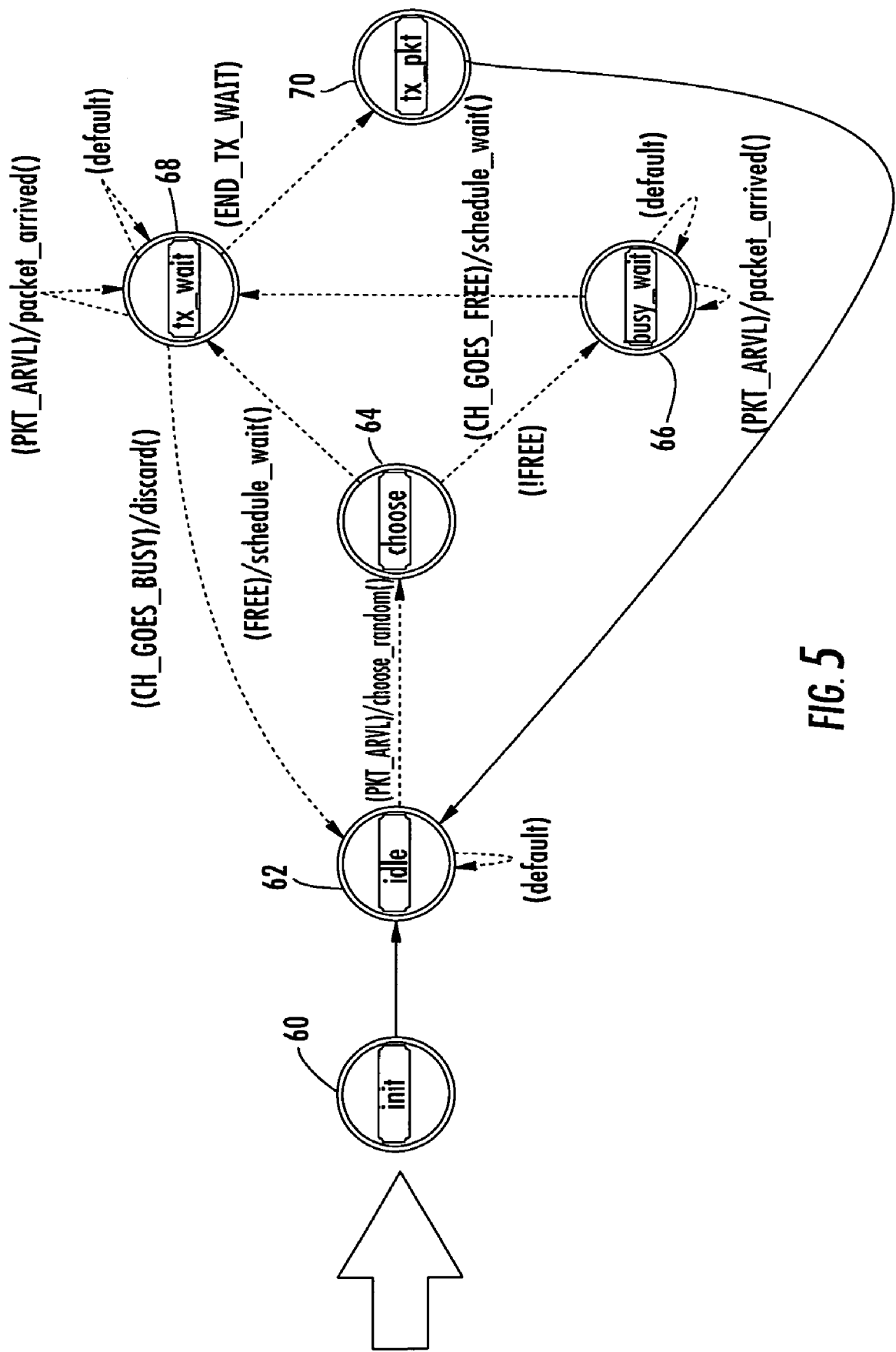
FIG. 5 is an example of a high-level model for a p-persistent CSMA network implemented using the OPNET Modeler communications network modeling and simulation environment and used to generate the performance data shown in FIGS. 6 through 12.

FIG. 5 is a high-level process model for a p-persistent COSMA OPNET simulation. As shown, the initialization state 60 is operative with an idle state 62. There is a choose state 64, busy_wait state 66, tx_pkt state 68, and tx_wait state 70 connected and operative as illustrated.

There now follows a more general description of the uses of the system as briefly described above, followed by greater details of the system, apparatus and method in accordance with non-limiting examples of the present invention.

In recent years military forces have become more mobile to meet contemporary mission requirements, and are frequently required to cover much larger geographic areas. As a result, forces frequently outrun the transmission range of traditional VHF and UHF line-of-sight communication systems. Similar issues can arise in non-military situations, for example, border security, drug interdiction, or natural disaster response. An emerging solution to these range problems is the use of HF radios for extended-range Combat Net Radio (CNR) and similar applications HF signals have the ability to propagate to and over the horizon using either sky wave or ground wave modes. This unique ability has allowed HF radio to address the coverage gaps not served by VHF/UHF radio and other Beyond Line of Sight (BLOS) communications systems. A key issue that is addressed when designing and using an HF radio network for this purpose, however, is the network traffic capacity resulting from the delivery latency and transmission overhead of HF voice communications waveforms and techniques.

HF communications used for 'extended-range combat net radio' and similar extended range communications applications are likely to be subjected to relatively heavy voice traffic loads in networks containing larger numbers of users than are typically seen in HP long-haul applications. In these extended-range radio applications, voice traffic capacity affects performance. This situation is complicated when users require 'all-informed' voice communications in which each net member hears transmissions by any other net member. The requirement for 'all-informed' communications precludes increasing network capacity by spreading the voice traffic across multiple frequencies, as would typically occur in networks using Automatic Link Establishment (ALE).

When standard HF data waveforms are used for digital voice communications, the resulting end-to-end voice latencies can be relatively large. These latencies result from design attributes of the MIL-STD-188-110B data waveforms giving them reliable performance on skywave channels. U.S. MIL-STD-188-110B, "Military Standard: Interoperability and Performance Standards for Data Modems," U.S. Department of Defense (2000) is hereby incorporated by reference in its entirety.

These waveform attributes include an initial preamble used for acquisition and synchronization, and the 600 ms short interleaver used at data rates of 75 to 2400 bps. These waveform attributes also create transmission overhead, for example, an amount by which the RF transmission on the channel exceeds in duration the voice audio payload being conveyed. The entire 600 ms preamble used in MIL-STD-188-110B short interleaving could result in an equal amount of overhead. Additional overhead, for example, about 300 ms as an average, results from the presence of an entire interleaver block at the end of a transmission, even if the final data bits only partially fill the last interleaver block. Still further overhead can result from other data included in the transmitted digital data stream.

HF voice communications networks can suffer from diminished capacity because of the increased latency and transmission overhead. Latency leads to transmission collisions in which two or more radios transmit simultaneously, frequently causing neither transmission to be received successfully. Networks containing relatively large numbers of users, e.g., 10 or more, with heavy traffic loads can suffer from frequent collisions between voice transmissions. When a collision occurs, the receiving radio's modem is typically captured by the first voice transmission to arrive. Any later transmission causes interference resulting in bit errors in the received data stream, leading to corruption of the received voice signal or, in secure communication modes, to loss of the entire incoming transmission if bit errors cause any crypto synchronization to fail.

The increased latency of the HF voice communications techniques is a principal factor responsible for the increased occurrence of collisions. For purposes of explanation, an HF voice network can be viewed as an example of a communications network using a CSMA (Carrier Sense Multiple Access) media access control (MAC) technique. Before transmitting, radio operators listen for traffic on the channel in order to avoid causing a collision by transmitting. Their listening to the channel fills the role of a 'carrier sense' mechanism in a CSMA system. As a result, an HF voice communications network could be properly called a 'hand-operated CSMA' system. Large end-to-end latencies such as can occur in an HF voice communications system limit the effectiveness of this manual 'listen-before-transmit' technique. The latency creates a time-window in which an operator's pressing the radio's key switch can cause a collision even though the operator has not yet heard (or has not recognized) an incoming transmission. It is desirable to reduce the end-to-end latency, preferably without changing the underlying voice coding or modem waveform in order not to forfeit performance advantages. It is desirable not to add additional voice coding techniques and waveforms, which could be expensive to procure and would complicate system operation and management. Fortunately, significant latency reductions are possible without changing the underlying voice coding and waveform.

The total latency from the key switch actuation to the receiving operator's hearing voice has both physical and human elements. The latency can be expressed as $t_{tx}+t_{prop}+t_{rx}+t_{sp}+t_{rr}$, where $t_{tx}$ represents the latency from the transmitting operator's keying the handset to the transmitting radio's beginning to emit RF energy. This can be determined by the properties of the waveform and voice coding, but primarily by the design of the transmitting radio. The $t_{prop}$ (propagation delay) could be less than 10 ms at most for the extended-range applications considered here, such as CNR in a non-limiting example. The $t_{rx}$ represents the latency from the arrival of RF energy at the receiving radio to the start of the audio signal played to the receiving radio's handset. This can be determined by the waveform, voice coding, and radio design. The $t_{sp}$ represents the latency from the removal of a hold-off tone in the transmitting operator's handset to an operator's beginning to speak. This human latency can be as much as 500 to 750 ms or more corresponding, for example, to a human reaction time. The $t_{rr}$ represents the latency from the arrival in the handset of the start of the transmitted operator speech, to the receiving operator's recognizing the speech so as to avoid transmitting and causing a collision. This is another human latency or 'reaction time' whose duration can be as much as 200 to 400 ms or more.

It is possible to reduce the total voice latency by providing an indication that the channel has become occupied based on some event occurring earlier in the receive process. Two events could be used, for example, crypto sync, which occurs when the receiving COMSEC device detects its synchronization preamble, and a modem preamble sync, which occurs when the receiving modem has processed the entire modem preamble. When the chosen event occurs, the system could attempt to reduce the likelihood of a collision by providing some sort of warning to the receiving operator that the channel is now busy. This could take the form of one of at least a visual indication and an audible signal. Also, the system could attempt to prevent a potential collision by prohibiting an operator from transmitting. When a receiving radio determines that a channel has become busy, for example, by detecting either of the two events identified above, it could ignore actuation of the handset key switch to prevent an operator from causing a collision. This could eliminate any possible human reaction time (required to recognize the visible or audible channel-busy indication) from the effective latency.

To understand the benefits and limitations of these approaches, a reasonably accurate and realistic model of an HF voice communications network from which performance estimates can be derived by one of at least mathematical analysis and simulation is now set forth.

As a first rough approximation, an HF voice network can be viewed as a 1-persistent CSMA system as noted in L. Kleinrock, F. A. Tobagi. "Packet Switching in Radio Channels: Part I—Carrier Sense Multiple-Access Modes and Their Throughput-Delay Characteristics," IEEE Transactions on Communications, Vol. COM-23 No. 12, pp. 1400-1416, (1975), the disclosure which is hereby incorporated by reference in its entirety Kleinrock and Tobagi give a throughput analysis of 1-persistent CSMA, for a model system with infinitely many nodes. This type of analysis provides useful approximate throughput estimates for networks with 10 or more users.

Figure 6:
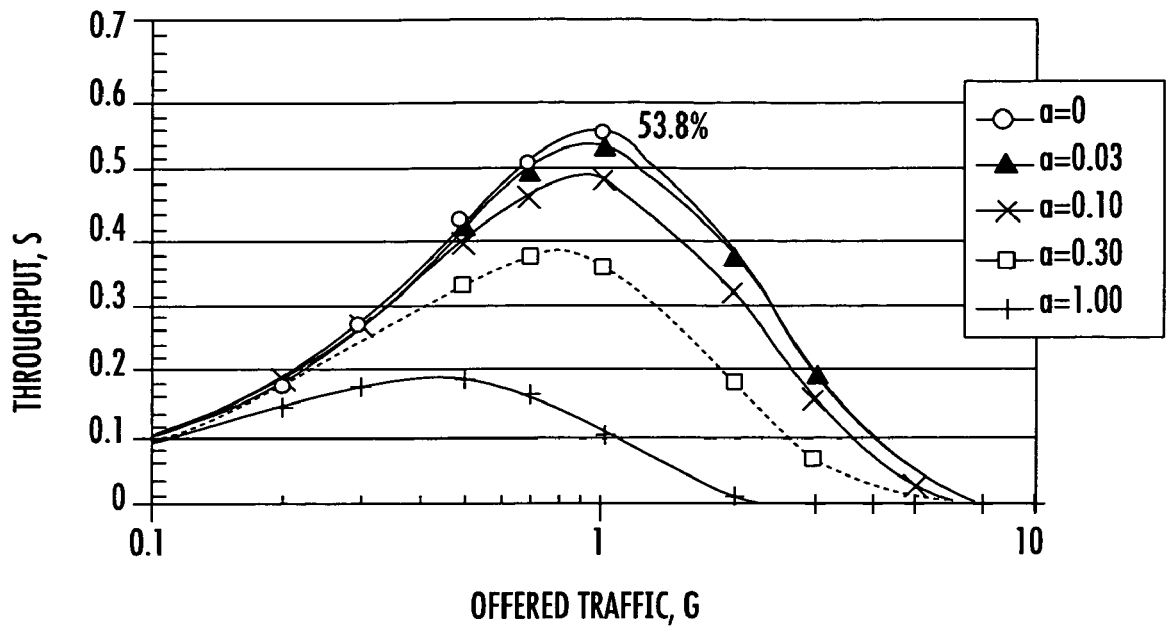
FIG. 6 is a graph showing the throughput "S" versus the offered load "G" for 1-persistent CSMA.

FIG. 6 is a graph showing network throughput "S" as a function of the offered load "G" for various values of end-to-end latency. In this example, it is normalized to a fraction of the transmission duration, which is assumed to be constant. "G" is the sum of the transmission durations of traffic arriving at all nodes, divided by total time. "S" is the sum of the durations of all successfully delivered traffic, divided by total time. A fully-loaded ideal network might have six ten-second voice messages arrive per minute for an offered load "G" or about 1.0, and deliver them all successfully for a throughput "S" of 1.0. Network throughput is substantially determined by the end-to-end latency. In the best case, with zero latency, throughput reaches a maximum of approximately 53.8%. For a transmission duration of about 10 seconds and a latency of about three seconds, the value of a latency normalized to a fraction of the transmission time is about 0.3, given a maximum network capacity of approximately 36.4% in this non-limiting example. The transmission overheads described above could reduce the effective network throughput by a further 10%, resulting in a maximum throughput of only about 32.7%.

Reducing the latency can yield a meaningful improvement in network capacity. The upper limit of 53.8% can be imposed by a 1-persistent CSMA model's assumption that, whenever a transmission is attempted while the channel is busy, the user waits until the channel becomes free and immediately thereafter starts to transmit. Whenever two or more transmissions are attempted during the same channel-busy period, they inevitably collide once the channel becomes free. This is not a completely accurate representation of radio operator behavior, however. There is some random time interval after the channel becomes free before an operator attempts to transmit. The difference between the times at which two users attempt to transmit could conceivably give the later of the two an opportunity to recognize the earlier one's transmission on the channel and avoid a collision. To address this possibility, the 1-persistent CSMA model is replaced with a p-persistent CSMA model.

One proposed model is by H. Takagi and L. Kleinrock, "Throughput Analysis for Persistent CSMA Systems," IEEE Transactions on Communications, Vol. COM-33, No. 7, pp. 627-638 (1985), the disclosure which is hereby incorporated by reference in its entirety. This model provides an analysis of the throughput of an unslotted p-persistent CSMA system. Their model formulation provides analysis results for systems containing finite numbers of nodes. The unslotted model is a more accurate reflection of the behavior of human operators than a slotted p-persistent model would be. The analysis formulas are not in closed form, however, making direct computation of the network performance estimates one might need difficult.

An OPNET simulation model of an unslotted p-persistent CSMA system conforms to their model definition and obtains excellent agreement with the throughput values as discussed below. In the description, 1/p is the mean value of an exponentially-distributed 'persistence latency.' It is the time that elapses between the channel's becoming free and a waiting radio's starting to transmit, so that p=infinity gives the equivalent of a 1-persistent CSMA system.

Figure 7:
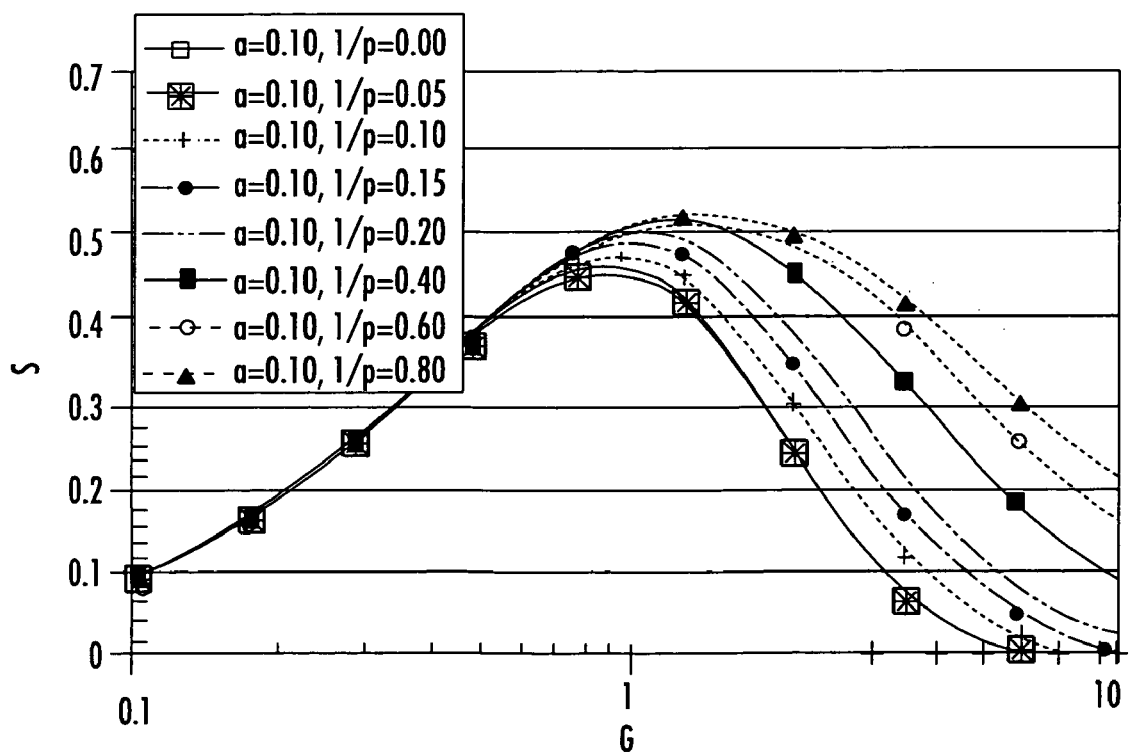
FIG. 7 is a graph showing unslotted p-persistent CSMA for 16 nodes.

FIG. 7 shows the impact of different values for 1/p on the throughput of a 16-user network with a=0.1. The addition of p-persistence provides a significant performance benefit only when the value of 1/p appreciably exceeds that of "a.". For p-persistence to prevent a collision after the channel becomes free, the difference in the times at which two users attempt to transmit must exceed the time required for the second user to detect the transmission by the first.

To make the OPNET simulation model a more accurate representation of a voice network of human operators, the exponential distribution of 'persistence latencies' can be replaced with a statistical distribution matching the observed behavior of human operators in laboratory measurements, which could be a random persistence latency with a mean of approximately 660 ms in this non-limiting example.

Figure 8:
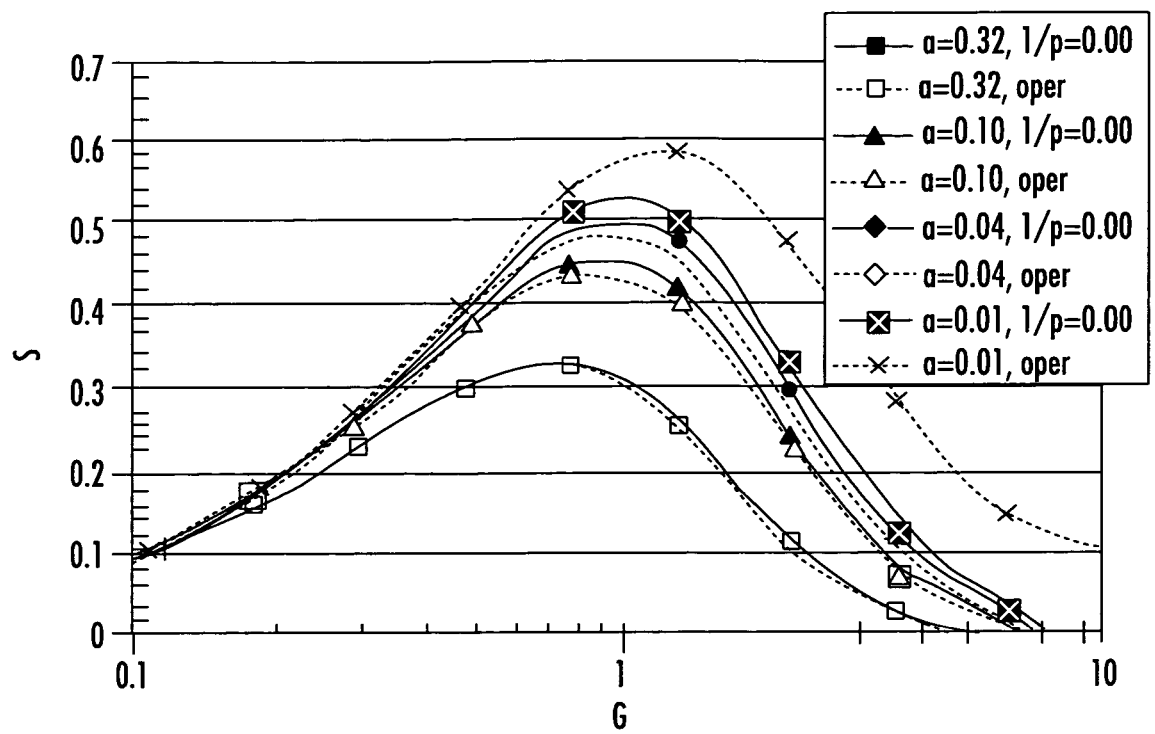
FIG. 8 is a graph showing the impact of "operator persistence" behavior.

FIG. 8 compares the levels of throughput obtained with a resulting model with those of 1-persistent CSMA for various values of "a." Series labeled "oper" in the graph legend refer to 'operator persistence' behavior based on observations and those labeled "1/p=0" in the graph legend refer to 1-persistent CSMA. For large or moderate values of "a," the 'operator persistence' behavior can reduce capacity. A random portion of an 'operator persistence' delay duration could be insufficient to reduce appreciably the likelihood of collision. As a result, the delay in transmitting after receiving adds overhead. However, 'operator persistence' could significantly reduce the frequency of post-channel busy collisions when the value of "a" becomes small, e.g., 0.02 or less, representing a latency reduction of more than 90% from an initial value of about three seconds.

A voice communications system could add an explicit random 'dead time' following each received transmission, which prevents some collisions among two or more users who initiate transmission attempts during a time in which the channel is busy. The receiving radio could implement a time-slotted 'persistence delay' scheme, increasing efficiency and preventing some collisions similar to the way that "Slotted Aloha" provides greatly increased throughput relative to "Unslotted Aloha."

A user wishing to transmit immediately following a channel-busy period would be allowed to transmit starting in a randomly-chosen time slot. The operator would press and hold the key switch to transmit. The radio would either commence transmission once the chosen time slot was reached, or abort the outgoing transmission and process an incoming transmission if one were to arrive earlier than the chosen time slot. The slot duration would have to be at least equal to the effective latency plus the maximum propagation time, to permit a transmission commenced in slot "n" to be detected prior to the start of slot "n+1." Such a scheme would be an application of the slotted p-persistent CSMA protocol. In this protocol, the time following the end of a received transmission is divided into a sequence of time slots of duration "a." In each slot, if it has not detected a new transmission on the channel, each station with new traffic begins to transmit with probability "p." Slotted p-persistent CSMA with a transmission probability "p=1" is equivalent to unslotted p-persistent CSMA with a mean persistence latency "1/p=0."

The end-to-end latency "a" could crucially determine the effectiveness of such a scheme. A smaller latency value would allow the slot duration to be small, permitting a smaller slot transmission probability "p" so as to more effectively prevent collisions, without excessively increasing the idle-time overhead resulting from idle slots prior to the start of a post-channel-busy transmission.

Capacity improvement could also be achieved by an 'explicit p-persistence' scheme for voice communications using a slotted p-persistence scheme.

Figure 9:
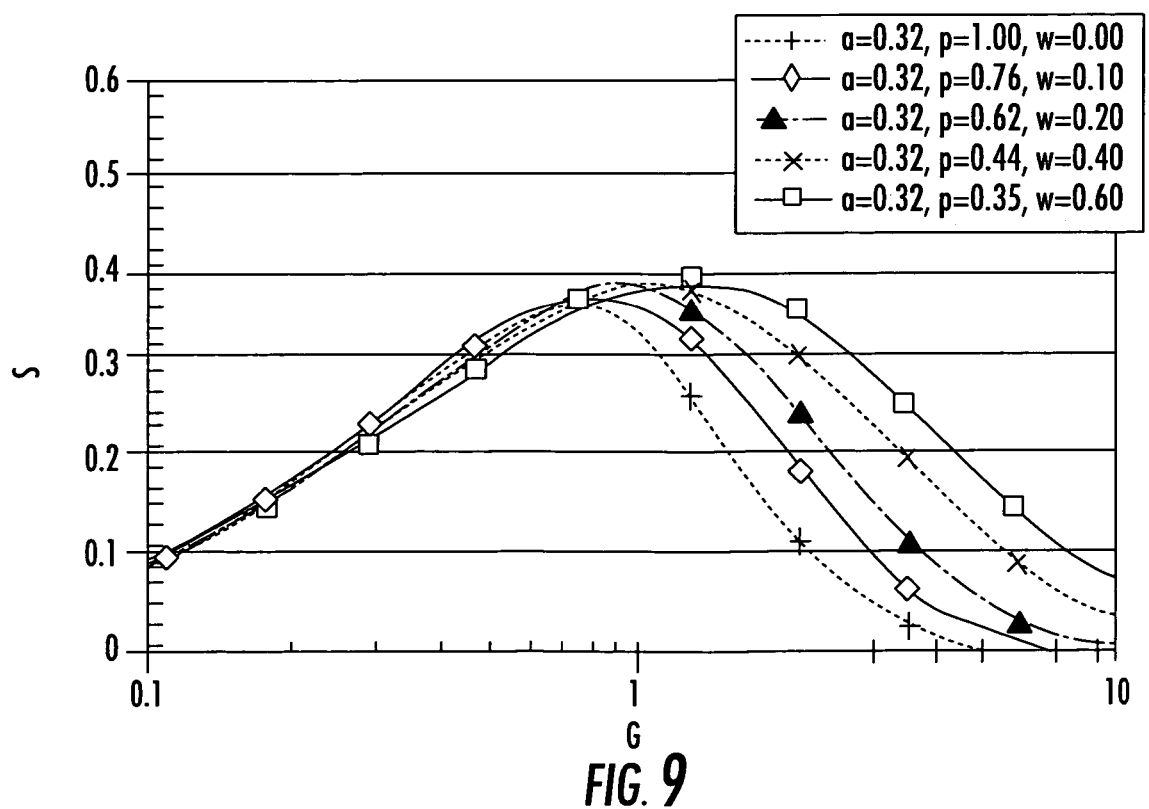
FIG. 9 is a graph showing slotted p-persistent CSMA with a large latency.

FIG. 9 is a graph showing throughput as a function of offered load for a 16-node network with a=0.32, corresponding to a 3.2 second latency with a fixed transmission duration of ten seconds, with a range of values of the transmission probability "p." For each "p" value, a corresponding value "we" represents the mean wait time once the channel becomes free for each transmission initiated during a channel-busy period. w=0.2 indicates that the mean wait time for each transmission is 0.2 times the transmission duration, or two seconds. In this case, the slot size must be large (>a). As a result, in order for the slot transmission probability "p" to be low enough to significantly reduce the frequency of collisions, the mean wait time "w" must be large enough to create a large amount of channel-idle time, reducing the throughput such that the addition of explicit p-persistence yields no significant increase in maximum throughput.

Figure 10:
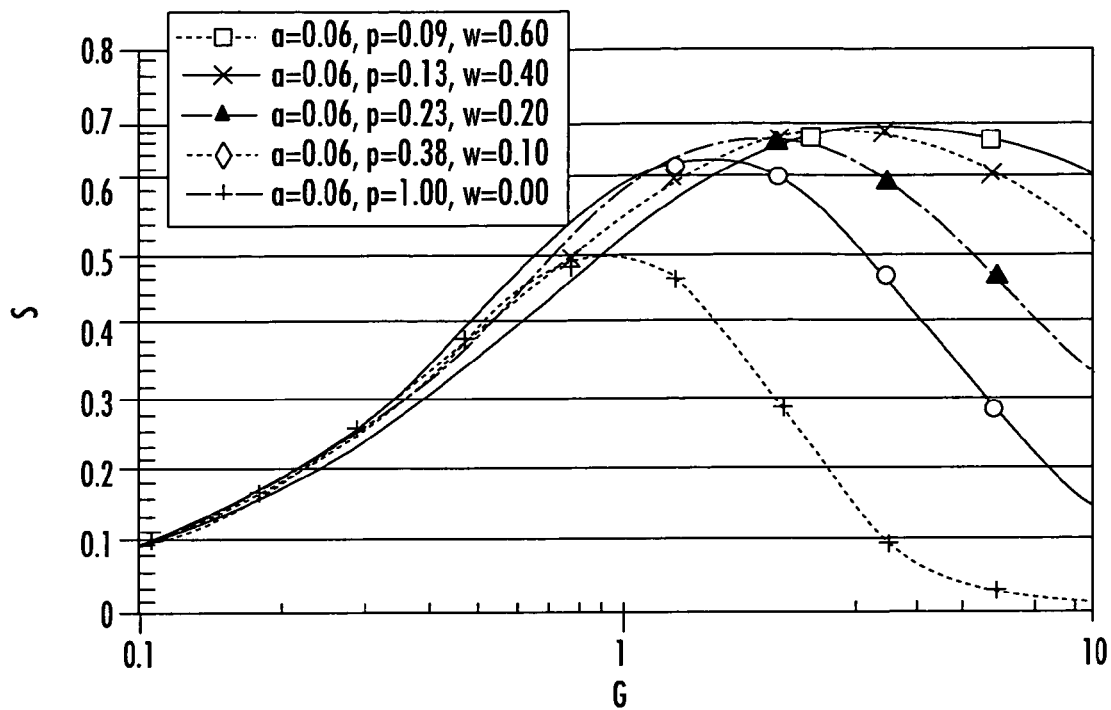
FIG. 10 is a graph showing a slotted p-persistent CSMA with reduced latency.

FIG. 10 is a graph showing throughput as a function of offered load for a similar network, but with a=0.06, representing a 600 ms latency. Even with no p-persistence (p=1.0), the reduced latency is beneficial, yielding a maximum throughput near 48%. Explicit p-persistence yields a further increase in throughput up to about 64% in this non-limiting example. The smallest "p" values corresponding to "w" values greater than 0.2 did not significantly increase maximum throughput, although they did increase throughput values for G>>1. This was achieved at the price of some reduction in throughput for G<1. For a variety of latency values "a," the fixed "p" values resulting in w=0.2 appeared to yield a near-optimal increase in maximum throughput, without significantly reducing throughput for G<1.

Figure 11:
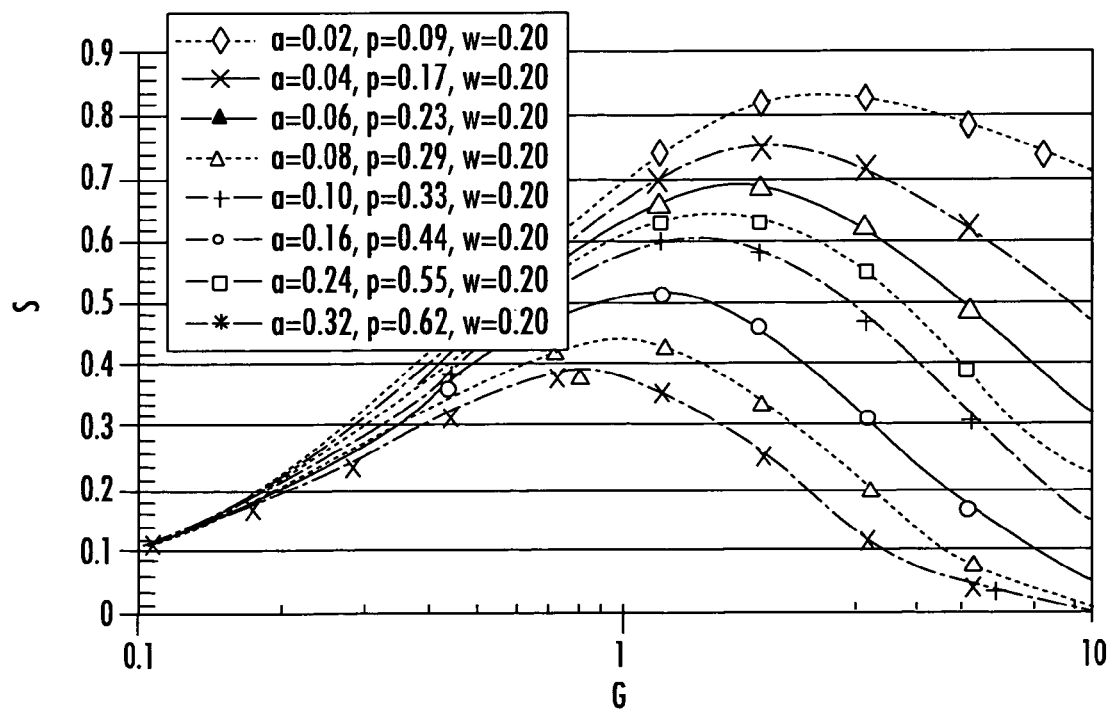
FIG. 11 is a graph showing the impact of latency reduction on capacity and slotted p-persistent CSMA.

FIG. 11 is a graph showing latency reduction and explicit p-persistence combined to substantially improve network capacity. With p=1.0, maximum capacity was limited to 53.8% even for a=0. Incorporating a mean 'persistence wait' of w=0.2 permits a maximum throughput approaching 80% to be achieved in this non-limiting example.

Figure 12:
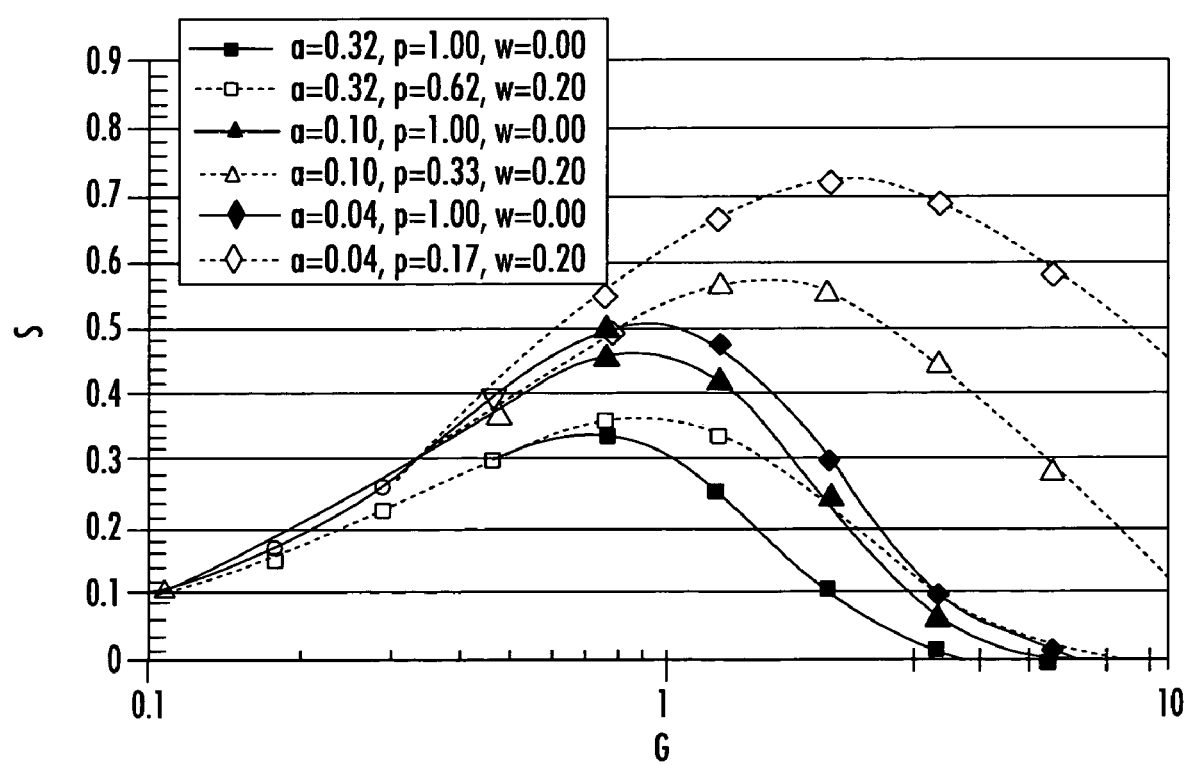
FIG. 12 is a graph showing the increase in capacity due to application of slotted p-persistent CSMA for different latency values.

FIG. 12 is a graph showing the increase in throughput attributable to explicit p-persistence for "a" values of 0.32, 0.1, and 0.04. The beneficial impact of explicit p-persistence increases markedly as latency is reduced below a=0.1. Even for a=0.1, however, the beneficial impact of adding explicit p-persistence is greater than that of reducing latency to as little as 0.04 without adding explicit p-persistence. The data presented in the graph of FIG. 12 suggest a possible course of action to improve the capacity of an HF extended range voice communications network such as CNR. From an initial latency near three seconds, a latency reduction to about one second, a=0.1, could be feasible when a MIL-STD-188-110A modem preamble is detected as early as possible, thus increasing network capacity to near 45%. Further latency reductions may diminish benefits because they do little to reduce the occurrence of post-channel-busy collisions. Adding 'explicit p-persistence, however, could increase network capacity to near 55%, and makes possible significant further capacity increases through further latency reduction.

HF communications systems used for extended-range radio applications are likely to be subjected to relatively heavy voice traffic loads in networks containing larger numbers of users than are typically seen in HF long-haul scenarios. In these extended-range radio applications, voice traffic capacity can be an important performance attribute. The communication techniques used in HF digital voice communications systems create large end-to-end voice latencies, which can frequently be on the order of three seconds or more. By modeling an HF voice communications network as a hand-operated CSMA system, this amount of latency can be seen to significantly reduce network capacity by increasing the frequency of voice traffic collisions. Reducing latency to one second or less would be likely to improve network capacity; however, the degree of improvement achieved in this way could be limited by the occurrence of collisions whenever two stations attempt to transmit following the end of a preceding transmission on the channel. The addition of an 'explicit p-persistence' scheme could be used to improve the capacity of an HF voice communications network when latency has been reduced to a sufficient degree. Once 'explicit p-persistence' is added, further latency reductions continue to yield improvements in capacity.

The system, apparatus and associated method in accordance with non-limiting examples of the present invention provide p-persistent CSMA to non-packetized digital voice communications.

In one non-limiting example, the p-persistence selectively follows some but not all transmissions on the channel. Such an approach can use p-persistence to avoid collisions in situations in which they would otherwise be likely to occur and can avoid incurring unnecessary overhead in situations where collisions would be unlikely to occur.

The system apparatus and associated method can apply p-persistence to manual initiation of transmissions, by using p-persistence to determine the first transmission time slot in which a user is allowed to transmit, and forcing user transmissions to start at the beginning of a time slot.

Figure 13:
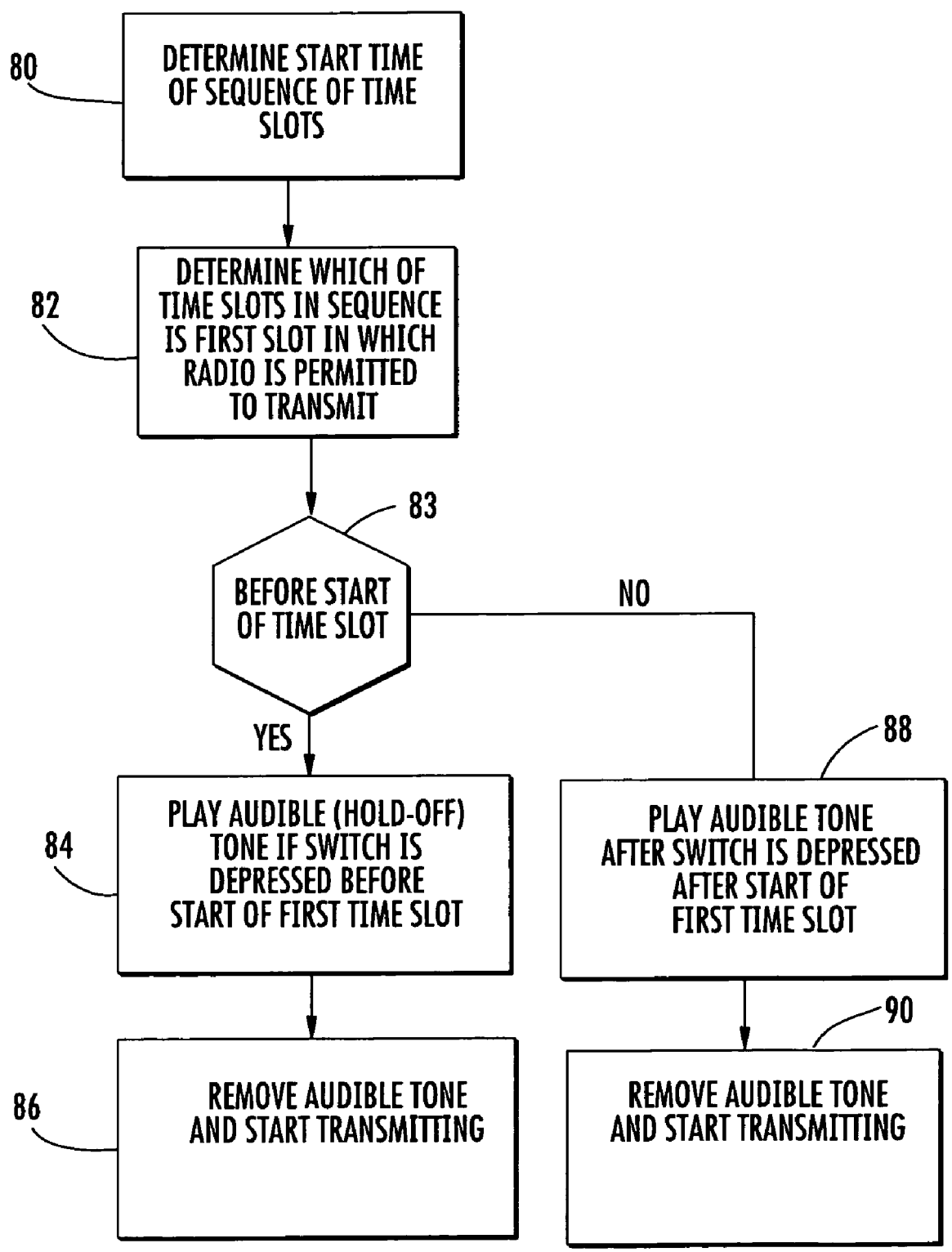
FIG. 13 is a high-level flowchart showing an example of the steps used in the sequence or flow for a p-persistent CSMA for non-packetized wireless digital voice networks in accordance with a non-limiting example of the present invention.

Referring now to FIG. 13, there is shown a high-level flow chart giving an example of the sequence, i.e., the process flow, in accordance with non-limiting examples of the present invention. When a radio receives the end of an incoming voice transmission, it can determine the start time of a sequence of transmitted time slots, each having a duration greater than the time required for the start of a voice transmission to be initiated at the transmitting radio, which is propagated over the wireless communications medium and detected by the receiving radio (Block 80). All radios in the system can determine the same start time to within a small time difference resulting from different propagation delays. The radio can then use a pseudo-random computation to determine which of the slots in the sequence is the first slot in which the radio is permitted to transmit (Block 82). Usually, if more than one radio has voice traffic to transmit, different radios will select different slots. Of these radios, the single radio whose selected slot appears earliest in the sequence can transmit. Other radios have time to detect this radio's transmission before starting to transmit and, as a result, no collision occurs.

A determination is made whether a key switch, e.g., a transmitter switch has been depressed before the start of a time slot (Block 83). If a radio operator presses the key switch before the start of the slot in which the radio determines that it is allowed to transmit, the radio does not transmit immediately. Instead, it plays an audible signal, e.g., a 'hold-off tone', at the operator's handset, informing the operator that the radio must wait before transmitting (Block 84). Once the start of the time slot in which the radio is permitted to start transmitting arrives, the radio removes the 'hold-off tone' and starts transmitting (Block 86). If a radio operator presses the key switch after the start of the first time slot in which the radio is permitted to transmit, the radio plays the hold-off tone (Block 88) and waits until the start of the next time slot before removing the hold-off tone and starting to transmit (Block 90). Starting transmissions on time slot boundaries improves the effectiveness with which collisions are prevented. If, before the radio starts to transmit in response to actuation of the key switch, it receives an incoming voice transmission, it does not have to start transmitting. Instead, it can play the received voice signal to the operator's handset. This could prevent the collision that would otherwise have occurred between the incoming and outgoing transmissions.

In this non-limiting example, the slot transmission probabilities, i.e., 'p values', for successive transmission time slots, can be adjusted to compensate for the probability distribution of key switch actuation over time by the radio operator and improve the efficiency with which collisions are avoided. For each transmission time slot $s_n$, a slot transmission probability $p_n$ could be determined from the nominal slot transmission probability "p." Each $p_n$ could be a monotonic function of "p," so that increasing or reducing "p" correspondingly increases or reduces each $p_n$.

It is also possible to adjust the nominal slot transmission probability "p" based on the observed channel utilization. For example, the value of "p" can be increased so as to reduce the mean wait time when channel utilization is low, while reducing the value of "p" and increasing the mean wait time when utilization is high.

It is also possible to adjust the nominal slot transmission probability "p" based on the number of users in the network. This could be based on communications planning information such as the number of stations identified in radio fill information, or based on the number of stations actively transmitting in the network over a recent time period.

The nominal slot transmission probability "p" can also be adjusted based on the amount of time the channel has been occupied by a single transmission or a series of transmissions. Continuous channel occupancy increases the likelihood that multiple voice messages are waiting to be transmitted, and hence could collide once the channel becomes free. The channel could be considered to be "continuously occupied," for this purpose, whenever a sequence of transmissions occupies the channel in which the gaps between successive transmissions are small enough to indicate that each transmission probably started within the persistence interval following the preceding transmission.

The nominal slot transmission probability "p" can also be adjusted based on the slot indices of chosen transmission time slots in past persistence intervals. If the earliest transmission time slots are used, this is an indication that a relatively larger number of users are attempting to seize the channel to deliver traffic whenever the channel becomes free.

The system can infer whether collisions are likely from patterns in the temporal sequence of past transmissions on the channel. For instance, in many systems, a majority of the voice traffic on a radio channel is composed of two-way voice conversations between two stations. Other users listening to the channel can determine that a two-way conversation is taking place, and avoid transmitting so as to prevent collisions. In this circumstance, operators themselves act to prevent collisions, so that the application of p-persistence is unnecessary. In particular, a station participating in such a conversation can so determine in the following way: If the station has recently transmitted, shortly thereafter received precisely one transmission, and is now about to transmit again, it is very probable that the station is participating in a two-way transmission in which collisions are unlikely to occur.

Using this inferred information, the system can determine whether to apply p-persistence on each occasion on which a transmission ends and the channel becomes free. It is also possible to use this inferred information to adjust the nominal slot transmission probability "p" to balance the requirement to avoid collisions in situations in which they would otherwise be likely to occur, against the need to avoid incurring needless overhead from application of p-persistence in situations in which collisions would be unlikely to occur in any case.

A station's role can be used to adjust its nominal slot transmission probability "p" to give it a higher likelihood of successfully transmitting in a persistence interval, when appropriate. In particular, it could be beneficial to give, for example, a military Net Control Station a high nominal slot transmission probability, allowing it to 'seize the channel' by transmitting in an early transmission time slot when it has voice traffic to transmit. This could be beneficial when a network is operated under directed voice procedures, allowing the Net Control Station preferential access to the channel so that it can effectively manage access to the channel by the other net member stations.

The voice information contained in a transmission could be processed to detect and recognize words or other information in the voice traffic, indicating whether or not the situation following the transmission is one in which collisions would be likely to occur. This can be used to determine whether to apply the p-persistence technique as described above. For example, in military voice procedures, ending a transmission with the word "OVER" indicates that a response is expected from a particular user. Ending a transmission with the word "OUT" frequently indicates that no response is expected and any user in the radio network may transmit with new traffic. Only in the latter case would voice transmission collisions be likely to occur. It could be beneficial to apply p-persistence in the latter case but not the former. A radio could analyze the voice payload information to determine whether the last word of the transmission was "OVER" or "OUT." This is a non-limiting example provided only in order to illustrate potential embodiments of the invention.

The system could use a means other than the words "OVER" and "OUT" by which the transmitting operator can indicate whether or not a response from a specific user is expected after the current transmission. For example, the operator could press a switch on the radio whenever he or she transmits a voice transmission containing the word "OUT." The transmitting radio could add a tag, for example, identifiable data, to the voice transmission, identifying it as the final transmission of a voice conversation. Other radios could use the p-persistence to prevent collisions after receiving a voice transmission tagged in this manner. The operator could also release the key switch, then quickly press and release it again to indicate that the channel is being released. These are non-limiting examples provided only in order to illustrate potential embodiments of the invention.

Figure 14:
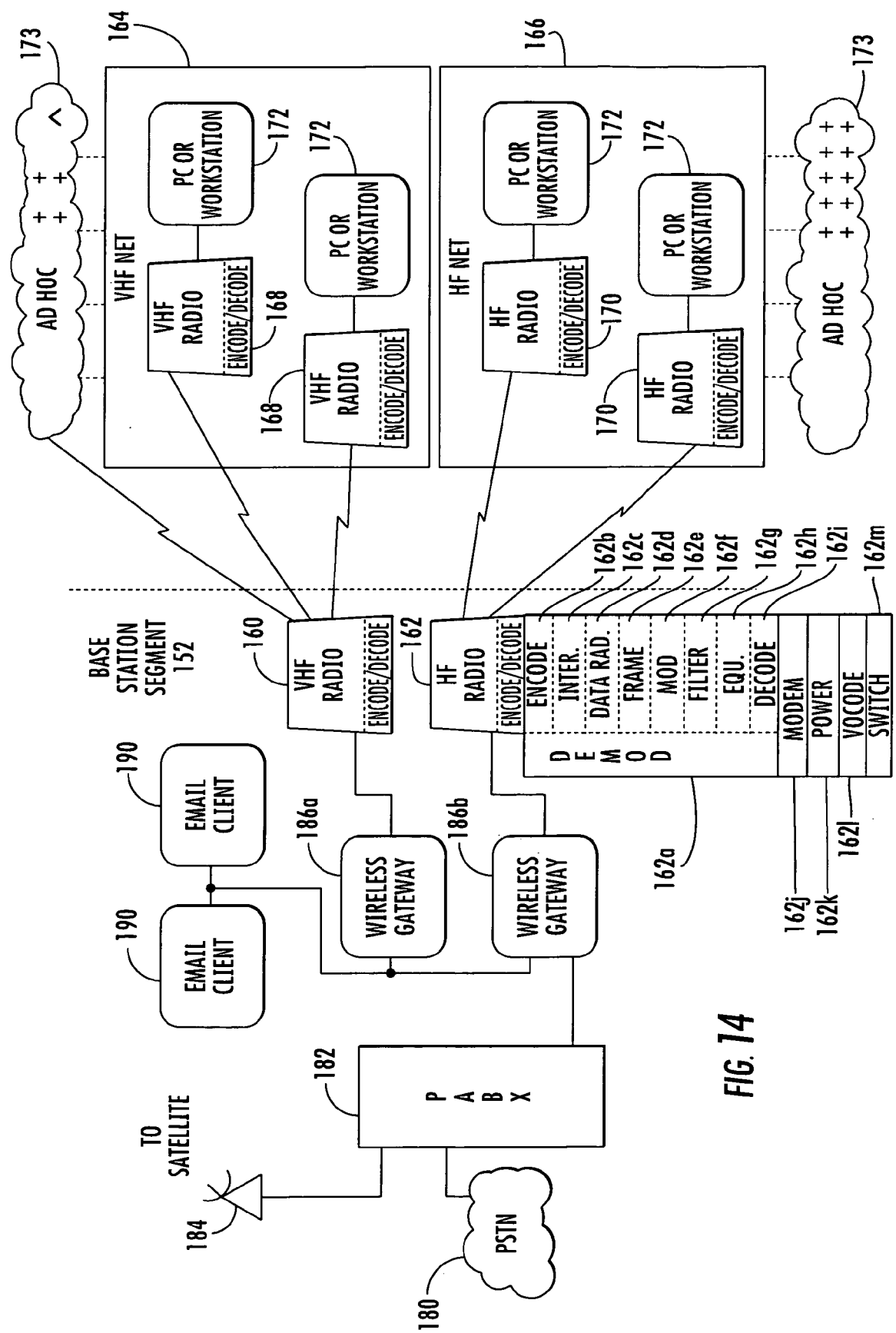
FIG. 14 is a block diagram showing a communications system that can use the p-persistent CSMA in accordance with a non-limiting example of the present invention.

An example of a communications system that can be modified for use with the present invention is now set forth with regard to FIG. 14.

An example of a radio that could be used with such system and method is a Falcon™ III radio manufactured and sold by Harris Corporation of Melbourne, Fla. It can include a basic transmit switch, and other functional switches and controls known to those skilled in the art. It should be understood that different radios can be used, including but not limited to software defined radios that can be typically implemented with relatively standard processor and hardware components. One particular class of software radio is the Joint Tactical Radio (JTR), which includes relatively standard radio and processing hardware along with any appropriate waveform software modules to implement the communication waveforms a radio will use. JTR radios also use operating system software that conforms with the software communications architecture (SCA) specification (see www.jtrs.saalt.mil), which is hereby incorporated by reference in its entirety. The SCA is an open architecture framework that specifies how hardware and software components are to interoperate so that different manufacturers and developers can readily integrate the respective components into a single device.

The Joint Tactical Radio System (JTRS) Software Component Architecture (SCA) defines a set of interfaces and protocols, often based on the Common Object Request Broker Architecture (CORBA), for implementing a Software Defined Radio (SDR). In part, JTRS and its SCA are used with a family of software re-programmable radios As such, the SCA is a specific set of rules, methods, and design criteria for implementing software re-programmable digital radios.

The JTRS SCA specification is published by the JTRS Joint Program Office (JPO). The JTRS SCA has been structured to provide for portability of applications software between different JTRS SCA implementations, leverage commercial standards to reduce development cost, reduce development time of new waveforms through the ability to reuse design modules, and build on evolving commercial frameworks and architectures.

The JTRS SCA is not a system specification, as it is intended to be implementation independent, but a set of rules that constrain the design of systems to achieve desired JTRS objectives. The software framework of the JTRS SCA defines the Operating Environment (OE) and specifies the services and interfaces that applications use from that environment.

The SCA OE comprises a Core Framework (CF), a CORBA middleware, and an Operating System (OS) based on the Portable Operating System Interface (POSIX) with associated board support packages. The JTRS SCA also provides a building block structure (defined in the API Supplement) for defining application programming interfaces (APIs) between application software components.

The JTRS SCA Core Framework (CF) is an architectural concept defining the essential, "core" set of open software Interfaces and Profiles that provide for the deployment, management, interconnection, and intercommunication of software application components in embedded, distributed-computing communication systems. Interfaces may be defined in the JTRS SCA Specification. However, developers may implement some of them, some may be implemented by non-core applications (i.e., waveforms, etc.), and some may be implemented by hardware device providers.

For purposes of description only, a brief description of an example of a communications system that would benefit from the present invention is described relative to a non-limiting example shown in FIG. 14. This high level block diagram of a communications system 150 includes a base station segment 152 and wireless message terminals that could be modified for use with the present invention. The base station segment 152 includes a VHF radio 160 and HF radio 162 that communicate and transmit voice or data over a wireless link to a VHF net 164 or HF net 166, each which include a number of respective VHF radios 168 and HF radios 170, and personal computer workstations 172 connected to the radios 168,170. Ad-hoc communication networks 173 are interoperative with the various components as illustrated. Thus, it should be understood that the HF or VHF networks include HF and VHF net segments that are infrastructure-less and operative as the ad-hoc communications network. Although UHF radios and net segments are not illustrated, these could be included.

The HF radio can include a demodulator circuit 162a and appropriate convolutional encoder circuit 162b, block interleaver 162c, data randomizer circuit 162d, data and framing circuit 162e, modulation circuit 162f, matched filter circuit 162g, block or symbol equalizer circuit 162h with an appropriate clamping device, deinterleaver and decoder circuit 162i modem 162a, and power adaptation circuit 162k as non-limiting examples. A vocoder circuit 162l can incorporate the decode and encode functions and a conversion unit which could be a combination of the various circuits as described or a separate circuit. A transmit key switch 162m is operative as explained above. These and other circuits operate to perform any functions necessary for the present invention, as well as other functions suggested by those skilled in the art. The circuits referenced here may include any combination of software and/or hardware elements, including but not limited to general purpose microprocessors and associated software, specialized microprocessors for digital signal processing and their associated software, Application Specific Integrated Circuits (ASICs), Field Programmable Gate Arrays (FPGAs), logic circuits, or other kinds of devices and/or software or firmware known to those skilled in the art. Other illustrated radios, including all VHF mobile radios and transmitting and receiving stations can have similar functional circuits.

The base station segment 152 includes a landline connection to a public switched telephone network (PSTN) 180, which connects to a PABX 182. A satellite interface 184, such as a satellite ground station, connects to the PABX 182, which connects to processors forming wireless gateways 186a, 186b. These interconnect to the VHF radio 160 or HF radio 162, respectively. The processors are connected through a local area network to the PABX 182 and e-mail clients 190.

The radios include appropriate signal generators and modulators. The non-packetized digital voice information transmitted within the network using the techniques of the present invention can originate at or be delivered to a handset connected to one of the radios, a telephone or other interface device attached to a wireless gateway device such as the RF-6010 Tactical Network Hub, or a subscriber telephone connected to the PABX or within the public switched telephone network.

An Ethernet/TCP-IP local area network could operate as a "radio" mail server. E-mail messages could be sent over radio links and local air networks using STANAG-5066 as second-generation protocols/waveforms, the disclosure which is hereby incorporated by reference in its entirety and, of course, preferably with the third-generation interoperability standard: STANAG-4538, the disclosure which is hereby incorporated by reference in its entirety. An interoperability standard FED-STD-1052, the disclosure which is hereby incorporated by reference in its entirety, could be used with legacy wireless devices Examples of equipment that can be used in the present invention include different wireless gateway and radios manufactured by Harris Corporation of Melbourne, Fla. This equipment could include RF5800, 5022, 7210, 5710, 6010, 5285 and PRC 117 and 138 series equipment and devices as non-limiting examples. These systems can be operable with RF-5710A high-frequency (HF) modems and with the NATO standard known as STANAG 4539, the disclosure which is hereby incorporated by reference in its entirety, which provides for transmission of long distance HF radio circuits at rates up to 9,600 bps. In addition to modem technology, those systems can use wireless email products that use a suite of data-link protocols designed and perfected for stressed tactical channels, such as the STANAG 4538 or STANAG 5066, the disclosures which are hereby incorporated by reference in their entirety. It is also possible to use a fixed, non-adaptive data rate as high as 19,200 bps with a radio set to ISB mode and an HF modem set to a fixed data rate. It is possible to use code combining techniques and ARQ.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A communications system, comprising:
   a plurality of radios that form a CSMA wireless communications network and communicate non-packetized digital voice with each other using single channel all-informed communications among the radios;
   each radio being configured to determine the end of conversations in a transmission and operative for dividing a period following the end of a received transmission into a sequence of time slots, and in each time slot, deciding randomly or pseudo-randomly with probability p whether to start transmitting on the channel in that slot based on an estimate whether channel contention is likely, provided that a new transmission has not been detected on the channel prior to the start of the slot.

2. The communications system according to claim 1, wherein a radio comprises a transmit key switch such that upon an operator's depressing said transmit key switch, said radio is operative for either commencing transmission once a chosen time slot is reached, or aborting transmission and processing an incoming new transmission if the transmission arrives earlier than the chosen time slot.

3. The communications system according to claim 1, wherein each slot in the sequence of slots has a duration at least equal to an effective end-to-end traffic latency which includes some or all of transmit latency, maximum propagation time, and latency of traffic detection by a receiver, so as to permit a transmission commenced in slot n to be detected prior to a start of slot n+1.

4. The communications system according to claim 1, wherein at least one of said radios adapts a probability p based on one or more of at least traffic loading, number of stations, priority of traffic and durations of past transmissions.

5. The communications system according to claim 1, wherein at least one of said radios is operative for determining a first transmission time slot for a transmission that starts at a beginning of a time slot.

6. The communications system according to claim 1, wherein slot transmission probabilities (p) for successive transmission time slots are adjusted to compensate for a probability distribution of key switch actuation over time.

7. The communications system according to claim 1, wherein at least one of said radios is operative for inferring whether collisions are likely from patterns in a temporal sequence of past transmissions on a communications channel.

8. The communications system according to claim 7, wherein a radio is operative for determining whether to apply a p-persistence on each occasion on which a voice transmission ends and a communications channel becomes free.

9. A method for communicating digital voice, which comprises:
receiving within a radio a non-packetized digital voice communications signal over a CSMA wireless communications channel as single channel, all-informed communications among a plurality of radios in a CSMA wireless communications network;
determining the ends of conversations in a transmission and dividing a period following the end of a received transmission into a sequence of time slots; and
in each time slot, deciding randomly or pseudo-randomly with probability p whether to start transmitting on the channel in that slot based on an estimate whether channel contention is likely, provided that a new transmission has not been detected on the channel prior to the start of the slot.

10. The method according to claim 9, which further comprises an operator's pressing and holding a transmit key switch at a radio to transmit, and the radio's either commencing transmission once a chosen time slot is reached, or aborting a transmission and processing an incoming new transmission if the transmission arrives earlier than the chosen time slot.

11. The method according to claim 9, which further comprises choosing a slot duration in the sequence of the slots at least equal to an effective end-to-end traffic latency which includes some or all of transmit latency, maximum propagation time, and latency of traffic detection by a receiver, so as to permit a transmission commenced in slot n to be detected prior to a start of slot n+1.

12. The method according to claim 9, which further comprises adapting the probability p based on one or more of at least traffic loading, number of stations, priority of traffic and durations of past transmissions.

13. The method according to claim 9, which further comprises determining a first transmission time slot in which a radio is allowed to transmit and forcing transmissions to start at a beginning of a time slot.

14. The method according to claim 9, which further comprises adjusting slot transmission probabilities (p) for successive transmission time slots to compensate for a probability distribution of key switch actuation over time.

15. The method according to claim 9, which further comprises inferring whether collisions are likely from patterns in a temporal sequence of past transmissions on a communications channel.

16. The method according to claim 15, which further comprises determining whether to apply p-persistence on each occasion on which a voice transmission ends and a communications channel becomes free.

17. The method according to claim 16, which further comprises applying p-persistence only when collisions are likely to occur so as to reduce overhead during transmission scenarios when collisions are unlikely.

18. The method according to claim 9, which further comprises processing information within a transmission to determine if a collision is likely to occur, and if so, applying p-persistence.

19. The method according to claim 18, wherein said information comprises one or more of at least voice information, and a data tag appended to a voice transmission.

20. The method according to claim 18, wherein an operator indicates to the radio whether a collision is likely to occur following a transmission, and incorporating this information into a voice transmission so that it can be used by receiving radios to decide whether or not to apply p-persistence following the transmission.

21. The method according to claim 20, wherein the operator so indicates by at least one of operating a switch or other control mechanism other than the key switch before, during, or after the voice transmission, and depressing of a key switch a predetermined number of times.

22. The method according to claim 18, which further comprises receiving a voice communications signal at one of plurality of mobile wireless communications devices that operate as a p-persistent CSMA wireless communications network.

23. A method for communicating digital voice, which comprises:
receiving within a radio a non-packetized digital voice communications over a CSMA wireless communications channel as single channel, all-informed communications among a plurality of radios in a CSMA wireless communications network;
determining the ends of conversations in a transmission and determining at the radio the start time of a sequence of transmit time slots;
determining which of the transmit time slots in the sequence of transmit time slots is a first slot in which the radio can transmit; and
determining randomly or pseudo-randomly with probability p whether to start transmitting on the channel in successive slots based on an estimate whether channel contention is likely, wherein if a key switch at the radio is depressed before a start of a time slot in which the radio can transmit, playing an audible signal as a hold-off tone at the radio and informing an operator that the radio must wait before transmitting, and when a next time slot arrives in which the radio can transmit, the audible signal is removed and the radio starts to transmit, and if a key switch is depressed after a start of the time slot, then waiting for a start of a next time slot to transmit.

24. The method according to claim 23, which further comprises playing a received voice signal if a radio receives an incoming voice signal before the radio starts to transmit in response to actuation of a key switch.

25. The method according to claim 23, which further comprises an operator's pressing and holding a transmit key switch at a radio to transmit, and the radio's either commencing transmission once a chosen time slot is reached, or aborting transmission and processing an incoming transmission if one arrives earlier than the chosen time slot.

26. The method according to claim 23, which further comprises choosing a slot duration at least equal to an effective latency end-to-end traffic latency which includes some or all of transmit latency, a maximum propagation time, and latency of traffic detection by a receiver, so as to permit a transmission commenced in slot n to be detected prior to a start of slot n+1.

27. The method according to claim 23, which further comprises adapting the probability p based on one or more of at least traffic loading, number of stations, priority of traffic and durations of past transmissions.

28. The method according to claim 23, which further comprises adjusting slot transmission probabilities (p) for successive transmission time slots to compensate for a probability distribution of key switch actuation over time.

29. The method according to claim 23, which further comprises inferring whether collisions are likely from patterns in a temporal sequence of past transmissions on a communications channel, and applying p-persistence only when such patterns indicate that collisions would otherwise be likely to occur.

30. A method for communicating digital voice, which comprises:
receiving within a radio a non-packetized digital voice communications signal over a CSMA wireless communications channel as single channel, all-informed communications among a plurality of radios in a CSMA wireless communications network;
dividing the period following the end of a received transmission into a sequence of time slots;
in each time slot, deciding randomly or pseudo-randomly with probability p whether to start transmitting on the channel in that slot, provided that a new transmission has not been detected on the channel prior to the start of the slot;
inferring whether collisions are likely from patterns in a temporal sequence of past transmissions on a communications channel;
determining whether to apply p-persistence on each occasion on which a voice transmission ends and a communications channel becomes free; and
applying p-persistence only when collisions are likely to occur so as to reduce overhead during transmission scenarios when collisions are unlikely.

31. A method for communicating digital voice, which comprises:
receiving within a radio a non-packetized digital voice communications signal over a CSMA wireless communications channel as single channel, all-informed communications among a plurality of radios in a CSMA wireless communications network;
dividing the period following the end of a received transmission into a sequence of time slots;
in each time slot, deciding randomly or pseudo-randomly with probability p whether to start transmitting on the channel in that slot, provided that a new transmission has not been detected on the channel prior to the start of the slot; and
processing information within a transmission to determine if a collision is likely to occur, and if so, applying p-persistence.

32. A method for communicating digital voice, which comprises:
receiving within a radio a non-packetized digital voice communications over a CSMA wireless communications channel as single channel, all-informed communications among a plurality of radios in a CSMA wireless communications network;
determining at the radio the start time of a sequence of transmit time slots;
determining which of the transmit time slots in the sequence of transmit time slots is a first slot in which the radio can transmit; and
if a key switch at the radio is depressed before a start of a time slot in which the radio can transmit, playing an audible signal as a hold-off tone at the radio and informing an operator that the radio must wait before transmitting, and when a next time slot arrives in which the radio can transmit, the audible signal is removed and the radio starts to transmit, and if a key switch is depressed after a start of the time slot, then waiting for a start of a next time slot to transmit; and
inferring whether collisions are likely from patterns in a temporal sequence of past transmissions on a communications channel, and applying p-persistence only when such patterns indicate that collisions would otherwise be likely to occur.

* * * * *